Sept. 7, 1943. M. KNOBEL 2,328,725
METHOD AND MACHINE FOR WINDING COILS
Filed May 26, 1941 5 Sheets-Sheet 2
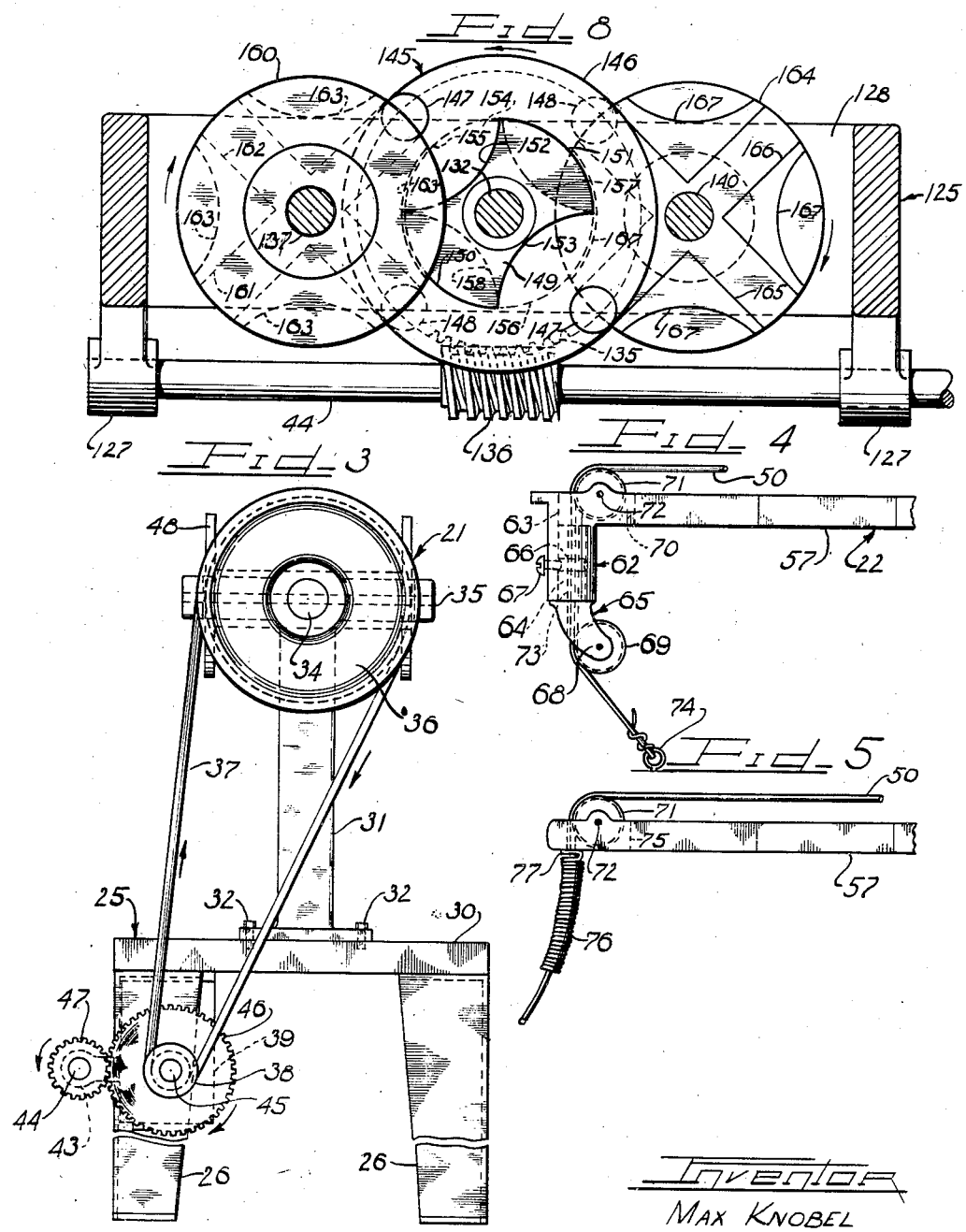
Inventor
MAX KNOBEL
By Charles... Attys Sept. 7, 1943.     M. KNOBEL     2,328,725
METHOD AND MACHINE FOR WINDING COILS
Filed May 26, 1941     5 Sheets-Sheet 3
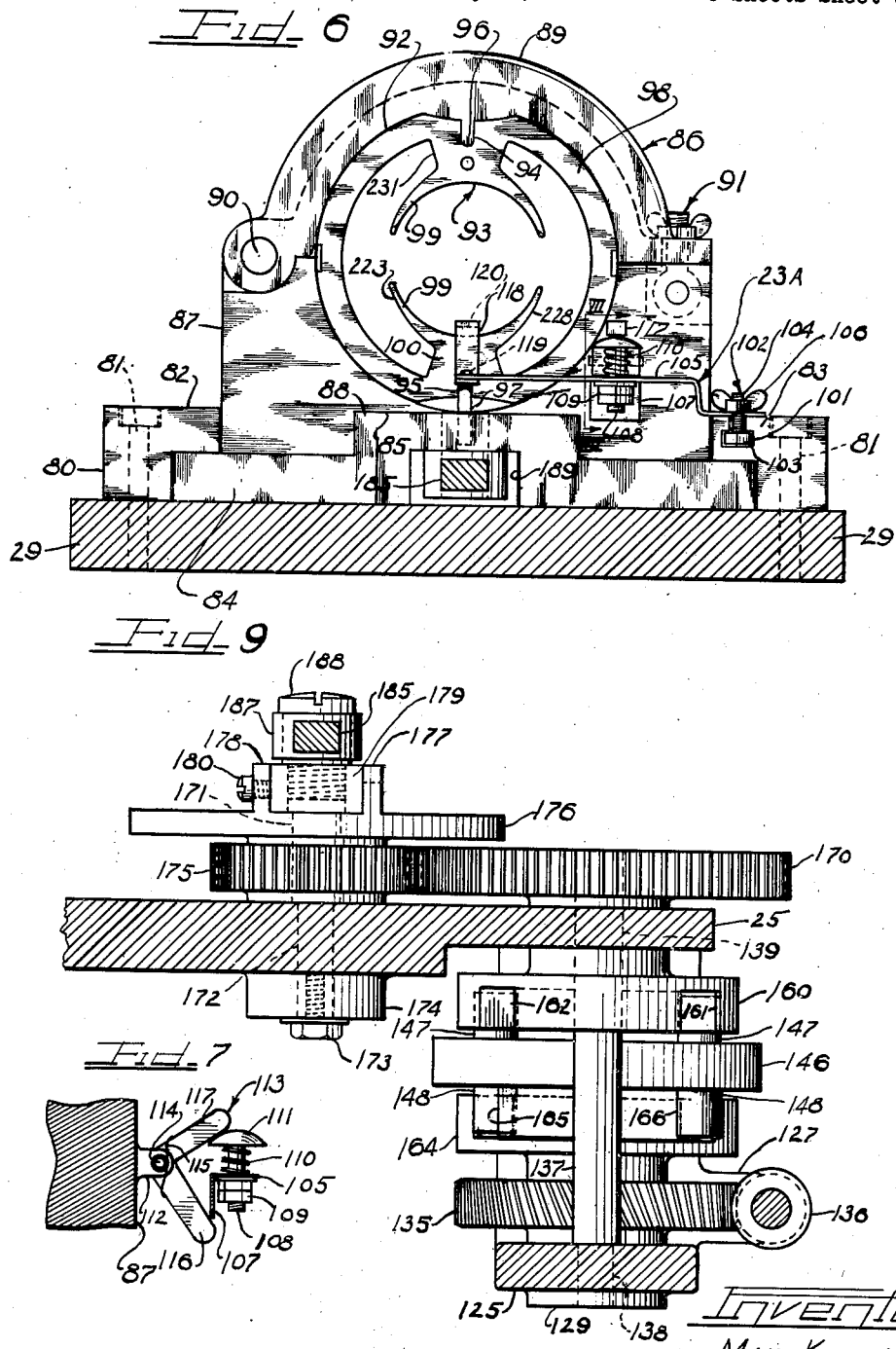
Inventor
MAX KNOBEL
by Charles Hill
Attys.

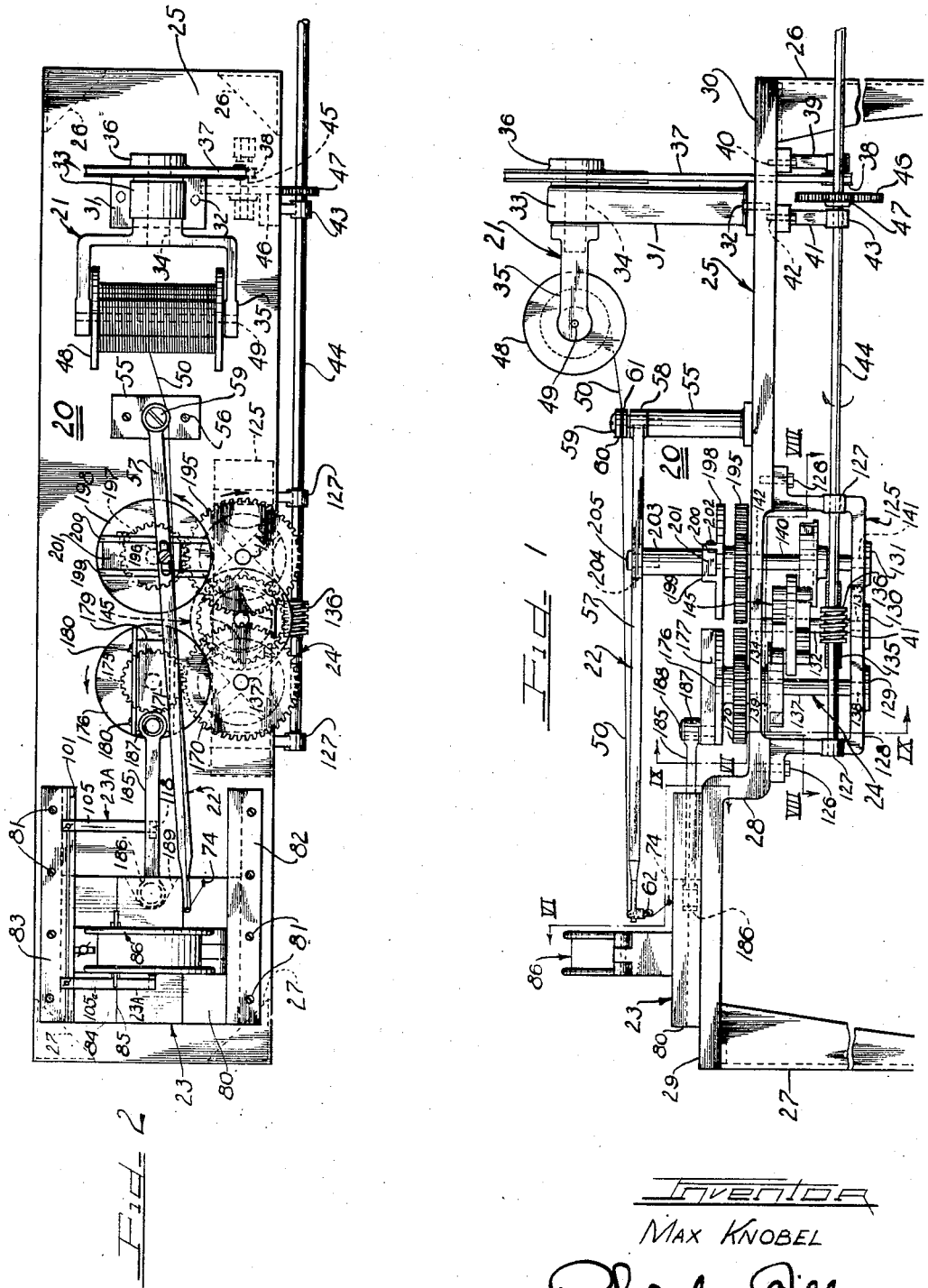

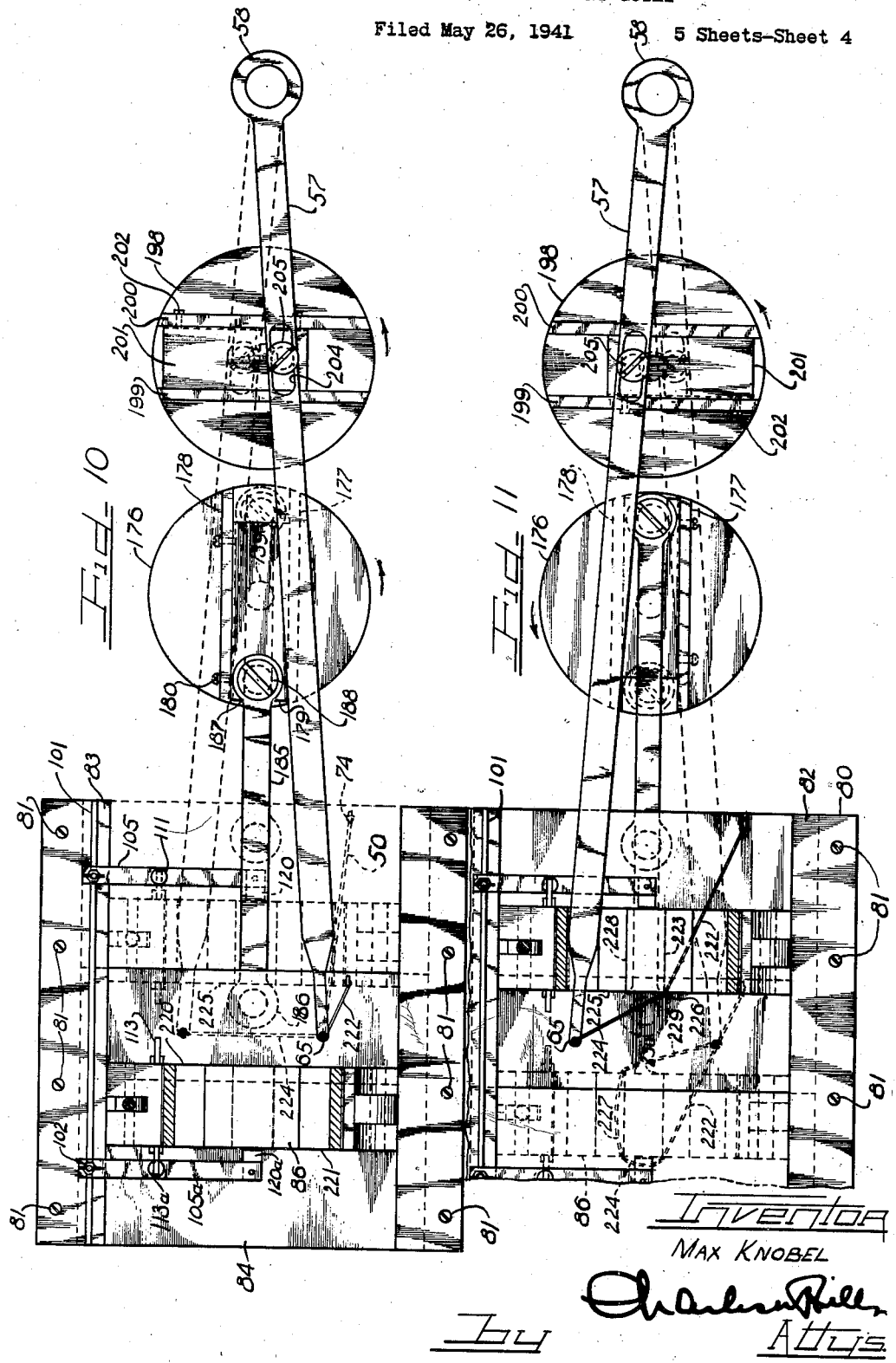

Sept. 7, 1943.                M. KNOBEL                2,328,725
              METHOD AND MACHINE FOR WINDING COILS
                   Filed May 26, 1941         5 Sheets-Sheet 5
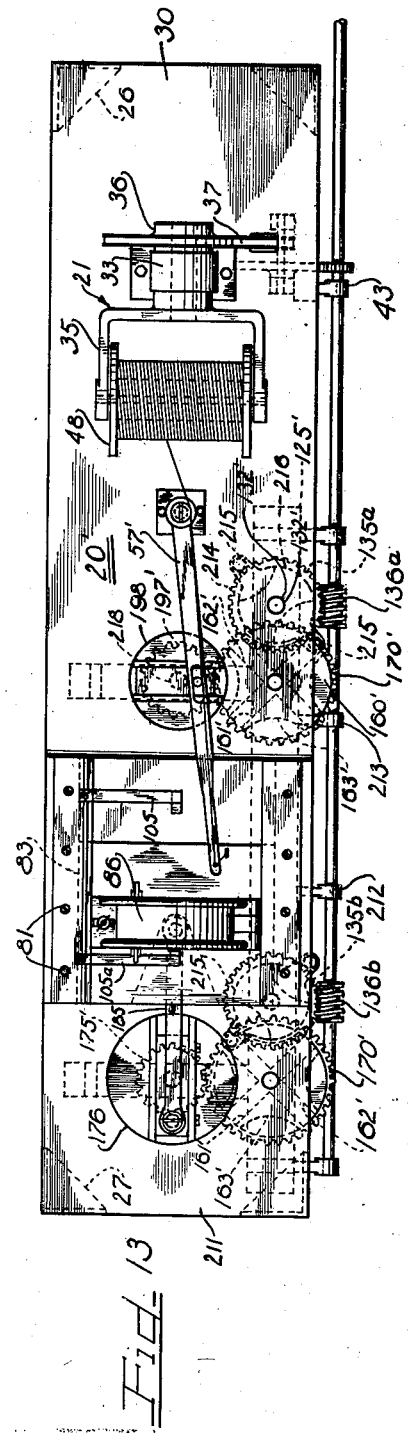
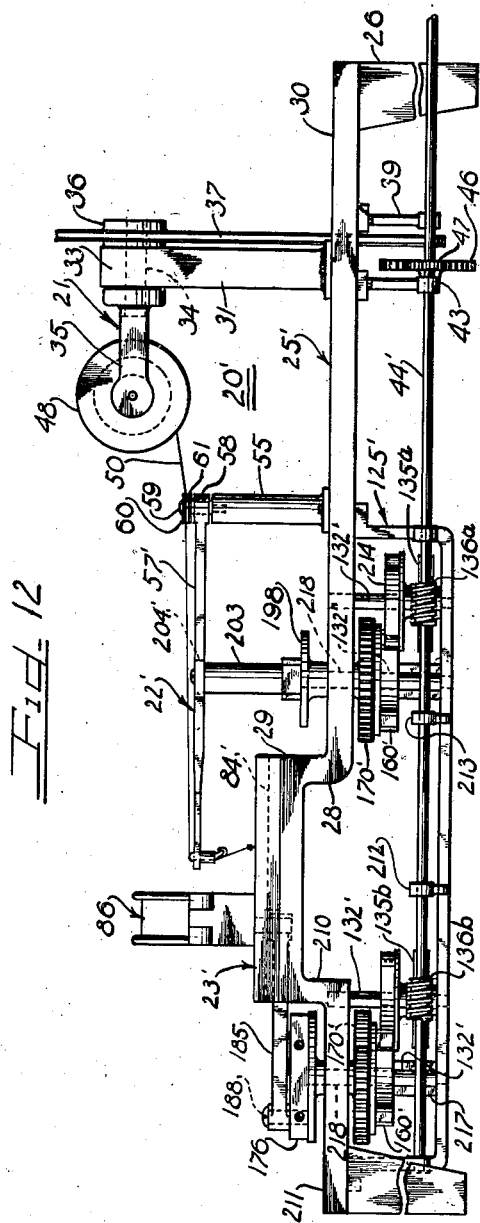
Inventor
MAX KNOBEL Patented Sept. 7, 1943

2,328,725

UNITED STATES PATENT OFFICE 2,328,725

METHOD AND MACHINE FOR WINDING COILS

Max Knobel, Cambridge, Mass., assignor by mesne assignments to Houdaille-Hershey Corporation, Detroit, Mich., a corporation of Michigan Application May 26, 1941, Serial No. 395,215

20 Claims. (Cl. 242—1)

This invention relates to a machine for winding wire coils and is more particularly directed to a machine for tightly winding the field coils on the poles of a laminated field structure for small electric motors.

In the design of small electric motors, and particularly of low voltage direct current fractional horsepower motors, it has been the common practice to form the field structure from a stack of laminations, each lamination including in a single piece the entire cross-section of the field structure. That is to say, a one-piece lamination includes two pole faces, two pole throats, and two integral connecting arcuate strips extending between the two pole throats and which thus form a unitary magnetic structure. A laminated field structure made up in this manner with a plurality of one-piece laminations has in the past employed relatively wide throats in comparison with the width of the pole face. This has been necessary in view of the fact that the coils for each pole were slipped over the head of the pole and then pushed down slightly behind the pole to hold the same in place. This pushing down of the coil on two of its four sides naturally causes an extension of the coil at the other two sides.

While this type of construction has been satisfying from several standpoints, including economy of assembly, there has, nevertheless, been several disadvantages. One disadvantage has been the fact that more copper has been employed in the field coil than is necessary to obtain the desired ampere-turns due to the relatively wide throat for each pole and due to the fact that two sides of the coil are pushed out away from the shank portion of the pole. It is to be remembered that it is not the length of wire which governs but rather the number of ampere-turns. In existing machines, due to the fact that it is desirable to thin out the flux at the leading or entering pole tip, the pole tip has been flared away to increase the air gap at this point. By employing a narrow throat construction, as is possible under the present invention, the desired flux distribution may be obtained without any substantial flaring away of the leading edge of the pole tip.

Obviously, in a field structure having a relatively narrow throat a shorter length of wire may be used in winding the desired number of turns on a pole thereof than on a pole of a field structure having a wide throat. The design of the field structure per se is described and claimed in my copending application entitled "Laminated field structure," Serial No. 378,199, filed February 10, 1941, now Patent No. 2,298,388, dated October 13, 1942, and assigned to the same assignee as the present invention. Therefore, this invention is not concerned so much with the relative width of the pole throat as it is with the winding of the field coil tightly around the throat so that a minimum amount of copper is employed. By winding the field coils tightly in place on the pole throat, a proper number of ampere-turns can be provided which lie closely adjacent the sides of the throat and which provides an improved field construction at less cost.

It is an object of the present invention to provide means and a method for winding wire in a coil around an element.

Another object of the present invention is to provide means for winding untwisted wire in coils around an object.

Another and further object of the present invention is to provide means for winding untwisted wire under tension in coils around an object.

A further object of the present invention is to provide an efficient means for directly winding in place an untwisted coil of wire around the throat of field pole.

A still further object of the present invention is to provide an automatically operated high speed machine for evenly winding tensioned wire in an untwisted coil directly on the tapered throat of the pole of a field structure.

Another object of this invention is to provide a machine for actuating an element in the path of a moving wire in such a manner that tight coil of the wire, having any desired number of turns, is wound on the element.

A still further object of this invention is the provision of an automatic machine for reciprocating a field structure toward and away from and in the path of a laterally moving wire threading mechanism in such a manner that a tight coil of the wire having any desired number of turns is tightly and evenly wound on a pole of the field structure.

Another object of this invention is the provision of a feed mechanism for a wire coil winding machine from which untwisted wire is fed to the machine.

Another object of this invention is the provision of a mechanism for evenly stacking the turns of wire as they are consecutively coiled around an object such as the pole of a field structure.

Still another object of this invention is the provision of a gear set for intermittently and alternately actuating a wire threading mechanism and an element to be wound with coils of wire.

According to some of the important features of this invention, wire held under tension is fed from a spool through a needle threading mechanism in a predetermined path. The spool is mounted for free rotation about its own axis and for driven rotation in a plane at right angles to its free rotation in order that twisting of the wire be eliminated as it is fed through the threading mechanism and wound in coils around an object.

The free end of the wire is then anchored to a reciprocating table on which a field structure or other device, to be wound with a wire coil, is clamped or mounted.

A driving mechanism intermittently and alternately reciprocates the mounting table and actuates the threading mechanism in directions transversely to the movement of the table thereby actuating the mounted field structure in the path of a moving wire.

The field structure is initially moved in a direction in which the stationary threading mechanism lays a length of wire along a side of the pole to be wound. The field structure is then held in a stationary position while the threading mechanism is swung in a direction transverse to the line of movement of the field structure. This movement of the threading mechanism lays a length of wire along a face at right angles to the previously mentioned side of the pole. The threading mechanism is then held stationary while the field structure is moved in a line back to its original position and a length of wire is thereby laid along the side of the pole opposite to the first mentioned side. The field structure is again held stationary while the threading mechanism is swung back to its original position to lay a length of wire on a face of the pole opposite to the first mentioned face. By these two intermittent and alternate movements of the mounted field structure and the threading mechanism, a single turn of wire is coiled around the pole of the field structure. Continued operation effects the winding of additional turns until the number desired has been reached.

A transmission gear set or sets connected to a single source of power provides the intermittent and alternate actuation of both the reciprocating table, on which the field structure is mounted, and the swinging threading mechanism, through which the wire is fed. The gear transmission is so connected to the reciprocating table and to the swinging threading mechanism as to be adjustable for regulating the moving distances thereof thereby providing a mechanism for winding different sized elements with wire coils.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawings, in which:

Figure 1 is a front elevational view of a wire coil winding machine constructed in accordance with the teachings of this invention;

Figure 2 is a plan view in elevation of the machine illustrated in Fig. 1;

Figure 3 is an enlarged end view in elevation of the machine illustrated in Fig. 1 when viewed from the right;

Figure 4 is an enlarged front view in elevation of the end of the wire threading mechanism illustrated in Fig. 1;

Figure 5 is a view similar to Fig. 4 illustrating a modified form of construction of an end for the wire threading mechanism;

Figure 6 is an enlarged vertcial cross-sectional view, with parts in elevation, of a field structure mounted on the reciprocating table taken substantially in the plane indicated by the offset line VI—VI of Fig. 1;

Figure 7 is an enlarged side view in elevation, with a part in cross-section, as seen in the plane indicated by the line VII—VII of Fig. 6 and looking in the direction of the arrows;

Figure 8 is an enlarged transverse cross-sectional view, with parts in elevation, as seen when looking in the direction of the arrows along the line VIII—VIII of Fig. 1;

Figure 9 is an enlarged fragmentary vertical cross-sectional view, with parts in elevation, taken substantially in the plane indicated by the line IX—IX of Fig. 1;

Figures 10 and 11 are enlarged plan views similar to Fig. 2 and illustrating diagrammatically the relative positions of the coacting elements for winding one turn of wire around the pole of a field structure; and, Figures 12 and 13 are views similar to Figs. 1 and 2 illustrating a modified form of construction of a wire coil winding machine embodying principles of this invention.

In general, the wire coil winding machine 20 of this invention may be considered to consist of a wire feed mechanism 21 from which untwisted wire is continually supplied to a threading mechanism 22, a reciprocating table 23 for mounting an element to be wound with coils of wire, a wire stacking device 23A, and an actuating mechanism 24 for intermittently and alternately actuating the reciprocating table 23 and the swinging wire threading mechanism 22.

For convenience, each of the above mentioned mechanisms will be described under a separate heading.

*Wire feeding mechanism*

The mechanism 21 from which wire is drawn is best illustrated in Figs. 1, 2 and 3. The mechanism 21 is illustrated as mounted on a main frame 25 which is supported in elevation by suitable pairs of legs 26 and 27. It is to be noted that the main frame 25 is upwardly offset as at 28 in order to provide an end 29 of the table in higher elevation than the other end 30 for a purpose that will be apparent from the description to follow.

An upstanding bearing bracket 31 is connected to the table portion 30 adjacent one end thereof by means of bolts 32 or the like. The upper end of the bracket 31 has a bearing portion 33 for rotatably receiving therethrough a shaft 34. A yoke 35 is connected to one end of the shaft 34 by any suitable means for insuring co-rotation therewith. A belt pulley 36 is similarly connected to the other end of the shaft 34 in such a manner that the bearing portion 33 is positioned between the yoke 35 and the pulley 36.

As best shown in Fig. 3, the pulley 36 is driven by a belt 37 which passes over and is driven by a driving pulley 38. The pulley 38 is held in aligned spaced relation from the pulley 36 by means of a depending bracket 39 which is connected to the lower surface of the main frame portion 30 by means of suitable bolts 40, rivets or the like. An additional bracket 41 is also connected to the lower surface of the main frame portion 30 in depending relation therefrom by means of bolts 42 and has a transversely extending bearing ear 43 for supporting an intermediate portion of a main drive shaft 44.

A source of power supply, such as an electric motor, engine or the like (not shown), may be used for driving the main shaft 44.

A short shaft 45 is supported at its ends by the spaced brackets 39 and 41 for mounting thereon the driving pulley 38 and a gear 46. A pinion 47 is carried by the main shaft 44 in meshing engagement with the gear 39 whereby rotation of the shaft 44 drives the pulley 36 through the pinion 47, gear 46, pulley 38 and belt 37. The enmeshed gear 46 and pinion 47 and the belt pulleys 36 and 38 are of a size sufficient to rotate the yoke 35 at a speed in a predetermined proportion to the speed of movement of the threading mechanism 22 and reciprocating table 23 as will be more fully described hereinafter.

A spool 48 is mounted for free rotation about its own longitudinal axis on a shaft 49 carried by the yoke 35. The yoke 35 is mounted for rotation on the bracket 31 (as previously described) for rotation about an axis lying in substantially a horizontal plane and perpendicular to the axis of rotation of the spool 48. The positive drive to the shaft 34, on which the yoke 35 is carried, causes the spool carrying shaft 49 to be revolved in a substantially vertical plane about its midpoint. As will presently be explained in greater detail, when the wire is wound around an object in a clockwise direction (as seen when looking down on the object) the spool 48 is revolved in a clock-wise direction (when viewed from the right as in Fig. 3) to prevent a counter-clockwise twisting of the wire, as would normally result if the axis of the spool were not revolved.

*The wire threading mechanism*

As shown in Figs. 1 and 2, a supporting column 55 is connected to the upper surface of the table portion 30 at a position intermediate the offset portion 28 of the table and the bearing bracket 31 by means of screws 56, bolts or the like. It is to be noted that the bearing bracket 31 and the supporting column 55 are positioned in alignment substantially along the longitudinal center line of the main frame 25.

An elongated arm 57 has an eye-portion 58 at one end thereof through which is received the shank of a screw 59 axially threaded into the top portion of the supporting column 55. The screw 59 provides a pivot around which the arm 57 swings in short arcs to be more fully described later.

A pair of washers 60 and 61 loosely embrace the shank of the screw 59 between the eye end 58 on the arm 57 and the head of the screw 59. These washers define a friction guide for the wire 50 as it is drawn from the spool 48. If desired, a spring (not shown) may be inserted between the eye end 58 and the lower washer 61 in order that the wire may be frictionally gripped as it passes between the washers 60 and 61. However, if a spring is not provided, the force by which the washers 60 and 61 grip the wire 50 may be varied by threading the head of the screw 59 downwardly into the supporting column 55 until the desired degree of friction is reached. The wire 50 may also be lopped around the shank of the screw 59 to provide additional friction.

As best shown in Fig. 4, the forward or free end of the elongated arm 57 is provided with a needle portion 62. The needle portion 62 extends downwardly and is axially bored as at 63 for receiving therein the upper end 64 of a caster-like member 65. The upper portion 64 of the member 65 has an annular peripheral groove 66 around an intermediate portion thereof to receive the inner end of a screw 67 threaded through a side wall of the needle portion 62. The inner end of the screw 67 engages the annular groove 66 to retain the upper portion 64 of the caster-like member 65 within the needle portion in such a manner that the caster-like member is free for rotation but cannot move in an axial direction. Downwardly extending legs 68 are provided on the member 65 for pivotally mounting there-between a guide pulley 69. This rotation of the caster member 65 permits the guide pulley 69 to turn in the direction in which the wire is laid thereby providing a rotatable support for the wire at all times.

A slot 70 is provided immediately adjacent the outer end of the arm 57 for receiving therein a guide pulley 71. The guide pulley 71 is mounted for free rotation by means of a pin 72 bridging the walls on opposite sides of the slot 70.

The free end of the wire 50 is withdrawn from the spool 48, inserted in the guide pulley 71 and through an axial opening 73 in the caster-like member 65, over the revolvable pulley 69 and is then looped through an anchor ring 74 embedded in the reciprocating table 23. When so positioned, an intermediate portion of the wire 50 is either looped around the screw 59 or is passed between the washers 60 and 61 with the proper tension applied to the wire as previously described herein.

As best shown in Fig. 5, a modified form of a needle arrangement on the end of the arm 57 may be substituted for the arrangement described above. In this construction the outer end of the arm 57 is provided with a vertically extending slot 75 within which the guide pulley 71 is pivotally mounted by means of the pin 72 in the same manner as illustrated in Fig. 4. The wire 50 passes over the pulley 71 and downwardly through a tightly coiled helical spring tube 76, one end 77 of which is connected to the arm 57 by means of welding or the like. This spring tube acts as a flexible guide for the wire as it is drawn through the arm 57. If desired, the slot 75 may be enlarged at its forward end and the end 77 of the spring tube 76 inserted therein as by a threaded connection or may be held in position by welding or any other of numerous well-known means. The terminal of the wire 50 is connected to the reciprocating table in the same manner as previously described. It will be apparent that the coil spring arrangement just described guides the wire in a manner similar to the caster needle arrangement 62 but is of much more simple construction than the latter.

The reciprocating table mechanism

As shown in Figs. 1, 2, 6, 10 and 11, a bed 80 for the reciprocating table is connected, with its longitudinal axis in alignment with the bearing bracket 31 and the supporting column 55, to the elevated end 29 of the main frame 25 by means of studs or screws 81. The longitudinal marginal edges of the bed 80 are provided with gib portions 82 and 83 for slidably retaining therein the reciprocating table 84 of the mechanism 23.

A longitudinally and upwardly extending tongue portion 85 is centrally provided on the reciprocating table 84. A clamp 86, the lower jaw 87 of which is slotted as at 88, is seated on the reciprocating table 84 between the gib portions 82 and 83 and is connected to the table by any suitable means such as cap screws (not shown). The upper jaw 89 is pivotally connected to the lower jaw by means of a pivot pin 90 in a well-known manner. The opposite ends of the jaws 87 and 89 are clamped together by means of a pivotally mounted screw and wing nut assembly 91, also in a well-known manner. The clamped jaws are shaped to provide a central bore 92 therethrough for receiving therein an article on which wire is to be coiled, such as a field structure 93.

In the field structure illustrated in Fig. 6, there is illustrated diametrically opposed inwardly extending radial slots 94 and 95. The inner periphery of the upper jaw 89 has a tongue 96 formed thereon for insertion into the slot 94 of the field structure. A pin or bar 97 is seated in the tongue portion 85 of the reciprocating table 84 to extend upwardly into the slot 95 of the field structure. The field structure is thereby securely clamped within the clamp member 86.

The field structure 93, usually of a laminated construction, includes an annular frame portion 98 and two poles 99 which are each connected to the frame portion by a relatively narrow throat portion 100.

A machine of the present invention will be described as winding a field coil around the throat portions 100 but it is to be understood that other elements may be wound with coils of wire in exactly the same manner. Where other elements of different shapes are to be wound, the only change necessary is in the provision of a clamp mounting therefor on the reciprocating table 84.

The wire stacking device

As best shown in Figs. 2 and 6, a wire stacking device 23A is illustrated comprising a pair of adjustable mechanisms, one on each side of the clamp 86. As both mechanisms are alike only one will be described in detail with the other mechanism being identified by like reference numeral having the sub-character a. An inverted T-shaped slot 101 is provided lengthwise of the gib portion 83 closely adjacent its inner margin. A cap screw 102 has its head 103 inserted in the wide portion of the slot 101 to slide lengthwise thereof with the shank 104 extending through the narrow portion of the slot. An offset bar 105 formed of flat metal has one end clamped to the gib portion 83 by means of a wing nut 106 being threaded around the shank of the cap screw 102 and against the bar.

As particularly shown in Figs. 6 and 7, an intermediate portion of the bar 105 is provided with a downwardly extending flange 107. A bolt 108 passes through an opening provided in the bar 105 and is adjustably retained in place by means of lock nuts 109 and a spring 110 seated between the bar 105 and a head 111 on the bolt 108. It is to be noted that the screw head 111 has a rounded contour for a purpose now to be described.

Spaced ears 112, only one of which is shown in Fig. 7, extend outwardly from a vertical face of the lower clamp jaw 87. A bell crank lever 113 is pivotally connected at its angle to and between the spaced ears 112 by means of a pin 114. A wire spring 115 has an intermediate portion thereof coiled around the pivot pin 114 with its ends seated against the bell crank arms 116 and 117 to normally hold them in the positions illustrated in Fig. 7.

As best shown in Figs. 2 and 6, a Z-shaped member 118 is connected at its lower end to the free end of the bar 105 by means of a rivet 119. The top portion of the member 118 is shaped to provide a flange 120 which extends towards the clamped field structure 93.

The bars 105 and 105a are adjusted along the slot 101 to positions adjacent the clamp 86 to be more fully described later herein.

The actuating mechanism

The actuating mechanism 24 for swinging the threading arm 57 and reciprocating the table 84 is best shown in Figs. 1, 2, 8 and 9. A U-shaped hanger 125 is connected to a portion of the main frame 25 adjacent the offset portion 28 in depending relation therefrom by means of cap screws 126 or the like. The downwardly depending legs of the U-shaped hanger have laterally extending aligned bearing lugs 127 for receiving therethrough an end of the main driving shaft 44. The horizontal web portion 128 which bridges the ends of the legs on the U-shaped hanger is provided with spaced vertically bored bearings 129, 130 and 131.

A main driving stub shaft 132 has its reduced end portion 133 seated in the vertical bore of the bearing 130 and extends upwardly through a bore 134 in the main frame 25 to terminate flush with the top surface thereof.

A main driving gear 135 is keyed or otherwise suitably connected to the stub shaft 132 in vertical alignment with the main driving shaft 44 which carries thereon a driving pinion 136 in meshed engagement with the main gear 135.

As best shown in Fig. 9, a shaft 137 has a reduced end portion 138 seated within the vertical bore of the bearing 129 and the shaft extends upwardly through an aligned bore 139 in the main frame 25 to terminate in spaced relation above the top of the main frame. Likewise, an additional shaft 140 has a reduced end 141 seated in the vertical bore of the bearing 131 and the shaft extends upwardly through an aligned bore 142 in the main frame 25 to terminate in spaced relation from the top of the main frame.

A set of gears 145 of the "Geneva stop" type is provided whereby the shafts 137 and 140 are rotated alternately in a predetermined timed relation.

A large disk 146 is keyed or pressed on the main driving stub shaft 132 at an intermediate portion thereof as shown in Fig. 1. A pair of upwardly extending pins 147 are diametrically disposed adjacent the periphery of the disk 146. Likewise, a second pair of pins 148 extend downwardly from the disk 146 and are diametrically disposed adjacent the periphery thereof at substantially 90° from the upwardly extending pins 147.

The disk 146 has an upwardly extending cam 149 defined by the convex surfaces 150 and 151 described by a radius struck from the center of the shaft 132 and which are inwardly concentric with the outer periphery of the disk. Concave surfaces 152 and 153 are provided for clearance of the cam 149 in a manner to be more apparent hereinafter.

A similar cam 154 is provided on the opposite face of the disk 146 extending in a direction substantially at right angles to the cam 149. The cam 154 has a pair of opposed convex surfaces 155 and 156 and a pair of oppositely disposed concave surfaces 157 and 158 formed similarly to the faces on the cam 149.

A slotted disk 160 is keyed or pressed on the shaft 137 in a position in substantial alignment with the cam 149 on the disk 146. Intersecting right angularly disposed diametrically extending slots 161 and 162 are provided in the lower portion of the disk 160 to slidingly receive therethrough the upwardly extending pins 147 on the disk 146. Recesses are milled or otherwise formed inwardly of the periphery of the disk 160 between adjacent ends of the slot 161 and 162 to provide inner concave surfaces 163. It is to be noted that the concavity of the surfaces 163 is such as to be concentric with and in closely spaced relation from the convex surfaces 150 and 151 on the cam 149 of the disk 146.

A disk 164, shaped similarly to the slotted disk 160, is keyed or otherwise suitably connected to the idler shaft 140 in a position substantially in alignment with the cam 154 on the disk 146. The disk 164 is connected to the shaft 140 in a reverse position relative to the position of the disk 160 on its shaft 137. In this position, the disk 164 provides intersecting right angularly disposed diametrically extending slots 165 and 166 terminating in spaced relation from the bottom face of the disk 164. Recesses are provided between adjacent ends of the slots 165 and 166 to form the concave surfaces 167. The slots 165 and 166 slidingly receive therethrough the downwardly extending pins 148 on the disk 146. The concave surfaces 167 are so disposed as to lie concentric with in closely spaced relation from the convex surfaces 150 and 151 of the disk 146 when in adjacent relation.

The disk 146 is drivingly rotated by cooperation of the driving gear 135 with the left-hand threaded pinion 136 through the main shaft 44, which in the present instance rotates in a counter-clockwise direction (Fig. 3). With the parts positioned as illustrated in Fig. 8, one of the pins 147 turning with the disk 146 in a counter-clockwise direction, as illustrated by the arrow, is in a position entering the end of the slot 161 in the disk 160. Simultaneously, the downwardly extending pin 148 on the disk 146 is just leaving the end of the slot 165 on the disk 164. It is to be noted that the convex surface 150 and concave surface 163 are turned away from each other as the pin 147 slides along the slot 161. Movement of the disk 164 is eliminated by the cooperation of the convex surface 156 on the disk 146 and the concave surface 167 on the disk 164.

The pin 147, during one-quarter revolution of the disk 146, slides toward and away from the center of the disk 160. When the pin 147 is adjacent the center of the disk 160 the latter has been rotated one-eighth of a turn and as the pin 147 slides back toward the periphery of the disk 160 the latter is turned through the balance of the quarter-turn. During this quarter revolution of the disk 160, the convex surface 151 moves into a position adjacent one of the concave surfaces 163. The coaction of these two surfaces maintains the disk 160 in a locked position until the opposite pin 147 has been turned into a position for engaging the end of the slot 162.

The downwardly extending pins 148 cooperate with the slots 165 and 166 on the disk 164 in exactly the same manner. Likewise, the convex surfaces 155 and 156 cooperate with the concave surfaces 167 for locking the disk 164 against rotation when the disk 160 rotates.

While the disk 146 is continuously rotated, the disks 160 and 164 are alternately rotated one-quarter of a turn. In this manner, the shafts 137 and 140 are alternately rotated one-quarter of a turn.

As best shown in Fig. 9, an externally toothed gear 170 is keyed or otherwise suitably connected to the top end of the shaft 137.

A stub shaft 171 has a reduced end portion 172 received through a suitable opening in the main frame 25 spaced along a transverse axis of the main frame from the shaft 137. A cap screw 173 is threaded into the reduced end 172 of the shaft and against a boss 174 on the lower side of the main frame for maintaining the shaft 171 in a vertical stationary position.

An externally toothed driven gear 175, in meshed engagement with the gear 170, is carried by the shaft 171 for free rotation relative thereto. A cross-head 176 is preferably formed integrally with the gear 175 but it is to be understood that both parts can be formed separately and connected together by any suitable means such as cap screws or the like. The cross-head 176 is generally disk-shaped having spaced axially extending legs 177 and 178. The top of the shaft 171 terminates flush with the top disk surface of the cross-head member 176 in order that an adjusting block 179 may slidingly seat between the legs 177 and 178. A cap screw 180 is threaded through the leg 178 for engagement with the adjusting block 179 to hold the latter in a position to which it is adjusted lengthwise of the slot defined between the legs 177 and 178. If necessary, additional cap screws 180 may be provided in order to insure the locking of the adjusting block 179 in an adjusted position in a manner as illustrated in Fig. 2.

A draw bar 185 is provided with eye portions 186 and 187 at the ends thereof for a purpose now to be described. The end 187 of the draw bar is connected to one end of the adjusting block 179 by means of a cap screw 188. The other end 186 of the draw bar is inserted within a slot 189 in the reciprocating table 84 and is pivotally connected thereto by any suitable means such as a cap screw similar to the cap screw 188.

It will be apparent from the foregoing that rotation of the cross-head member 176 will effect reciprocation of the table 84 through the draw bar 185. The reciprocating stroke of the draw bar 185 may be varied by adjusting the adjusting block 179 within the slot defined by the legs 177 and 178.

As best shown in Figs. 1 and 2, an externally toothed gear 195 is keyed or pressed on the upper end of the shaft 140. A stub shaft 196 is vertically connected to the main frame 25 in spaced relation from the idler shaft 140 and in alignment therewith along a transverse axis of the main frame in the same manner as the connection of the stub shaft 171 to the main frame. A driven gear 197 is rotatingly supported by the shaft 196 for meshed engagement with the gear 195. A cross-head member 198, shaped similar to the cross-head member 176, is either an integral part of the gear 197 or connected thereto by means of screws, welding or the like. Spaced legs 199 and 200 are provided on the upper face of the cross-head member 198 to slidingly receive therebetween an adjusting block 201. Cap screws 202 are threaded through the leg 200 for the purpose of locking the adjusting block 201 in a position to which it is moved.

A crank member 203, either an integral part of or suitably connected to the adjusting block 201, extends vertically between the adjusting block and the elongated arm 57. An elongated slot 204 is provided in the arm 57 for receiving therethrough a cap screw 205 which is threaded into the crank member 203. An adjustable connection is thereby provided between the cross-head member 198 and the arm 57 to swing the latter in a horizontal plane. The elongated slot 204 permits relative movement in a direction along the longitudinal axis arm 57 of the cap screw 205 as it is turned by the cross-head member 198. It will be apparent that by adjusting the adjusting block 201 toward or away from the center of the cross-head member 198 that the swinging movement of the arm 57 may be increased or decreased as desired.

Inasmuch as the arm 57 and the table 84 are actuated by the shafts 140 and 137, alternate actuation thereof is effected.

Modified constructions

In Figs. 12 and 13, there is illustrated a modified form of construction of a wire coil winding machine 20'. The machine 20' is the same as the machine 20 illustrated in Fig. 1 with the exception that the actuating mechanisms for the threading mechanism 22' and the reciprocating table mechanism 23' are disposed in spaced relation from each other along the main driving shaft 44'.

The main frame 25' has a raised portion 29 adjacent the left-hand end thereof formed by the offset portions 28 and 210. This provides an end 30, which is lower in elevation than the frame portion 29, at the right-hand end thereof and a relatively short frame portion 211 at the left-hand end thereof. The entire wire feed mechanism 21 is connected to the frame portion 30 in the same manner as previously described with the construction illustrated in Fig. 1. The threading mechanism 22' is the same as that illustrated in Fig. 1. The reciprocating table mechanism 23' is the same as that illustrated in Fig. 1 with the exception that the table 84' has the ends thereof reversed.

The U-shaped hanger 125' is of the same shape as the hanger 125 with the exception that it is more elongated and provides additional bearing supports 212 and 213 intermediate its ends for additionally supporting the main drive shaft 44'.

A shaft 132' has its ends seated in the frame portion 30 and in the web portion of the bracket 125'. A pinion 136a carried by the main drive shaft 44' meshes with a driving gear 135a in the same manner as shown in Fig. 1. A disk member 214 is provided with upwardly extending pins 215 and a cam portion 216 in the same manner as the top portion of the disk member 146. The disk is keyed or otherwise suitably connected on the shaft 132' adjacent the gear 135a.

A second shaft 132" is shaped in the same manner as the shaft 132' and is seated at its ends in the web of the bracket 125' and the frame portion 30. A disk 160' is provided with intersecting slots 161' and 162' and a plurality of concave faces 163' in the same manner as with the disk 160. The disks 160' and 214 coact in the same manner as the disks 146 and 160. In order that the disks 160' and 214 be maintained in proper alignment, a spacing sleeve or hub 217 is inserted between the disk 160' and the web of the bracket 125'. A gear 170' is either formed integral with the disk member 160' or is keyed or otherwise connected to the shaft 132" as shown in Fig. 12. A shaft 218 is inserted through a suitable opening in the frame portion 30 to receive at one end thereof the cross-head member 198. A gear 197' is keyed or otherwise suitably connected to the other end of the shaft 218 in aligned meshed engagement with the gear 170'. Connection between the cross-head member 198 and the threading arm 57' is effected in the same manner as illustrated in Fig. 1.

As the actuating mechanism for the table 84' is exactly the same as the actuating mechanism for the threading mechanism 22' just described, similar parts of the two mechanisms are identified by like reference numerals. The upper end of the shaft 218 for actuating the reciprocating table mechanism 23' has connected thereto a cross-head member 176. The cross-head 176 and the reciprocating table 84' are adjustably connected by a draw bar 185 in the same manner as illustrated in Fig. 1.

It will be apparent from the foregoing that the wire coil winding machines of Figs. 1 and 12 are substantially alike and differ only in the separate actuating mechanisms for the threading mechanism and the reciprocating table mechanism. It will be further apparent from the following description of the operation of the machine of Fig. 1 that the machine illustrated in Fig. 12 operates in a like manner.

Operation

Referring particularly to Figs. 10 and 11, the operation of the wire coil winding machine illustrated in Fig. 1 will now be described. The adjusting blocks 187 and 201 are first properly adjusted on the cross-head members 176 and 201 in the following manner. The intermeshed pairs of gears 170, 175 and 195, 197 each provide a 2 to 1 ratio so that a quarter of a turn on the shafts 137 and 140 will rotate the cross-heads 176 and 198 a half turn. The draw bar 185 is then adjusted to the position as illustrated in full lines in Fig. 10 by loosening the cap screws 180 and sliding the adjusting block 179 to the left until the threading end 62 of the arm 57 is closely spaced from the face 220 of the clamp 86. The throw of the pin 188 is such that the table 84 will be reciprocated a distance in which the needle end 62 of the arm 57 will alternately be adjacent opposite faces of the clamp 86 as the table moves to its limits of reciprocation.

The bars 105 and 105a are then adjusted to positions adjacent the limits of reciprocation of the clamp 86. The positions are such that the bell crank arm 116 will cam against the flange 107 whereby the arm 117 will push the screw head 111 downwardly which in turn will push the bar 105 and the bar flange 120 downwardly. Likewise, the bar 105a is adjusted to a position adjacent the face 221 on the clamp 86 when at its limit of movement to the left. The bar 105a and its flange 120a are then forced downwardly.

The arm 57 is then adjusted to its limits of swing from the positions shown in full lines to the position shown in dotted lines. This distance must be sufficient to bridge the pole portions 99 on the field structure 93. Adjustment of the arm 57 is effected by sliding the adjusting block 201 toward or away from the center of the cross-head member 198. The distance the cap screw 205 is moved outwardly from the center of the cross-head member 198 will determine the throw of the cap screw and the swinging distance the arm 57 is actuated.

The threading end 62 of the arm 57 is initially positioned between a pole portion 99 and an adjacent portion of the annular frame 98 on the field structure to permit the threading end of the arm to be moved through the field structure. Where the object to be wound is the pole throat of a field structure, the pole is first insulated with paper or other means (not shown) before the coils of wire are wound therearound.

When power is applied to the machine 20 through the main drive shaft 44 to turn the latter in a counter-clockwise direction when viewed from the right end of the machine, the cross-head member 176 is rotated in a counter-clockwise direction a half-turn in which the end 187 of the draw bar 185 is moved from the position illustrated in full lines to the position illustrated in dotted lines. This movement of the draw bar pulls the table 84 to the right and the field structure clamped thereon moves by the threading end 62 of the arm 57 to a position in which the threading end of the arm is spaced from the face 221 on the clamp 86. As the table 84 moves to the right, it draws the wire 50 through the threading arm 57. The wire 50 is frictionally held between the washers 60 and 61 for the purpose of maintaining the wire under tension and in tight relation between the threading end, either the caster arrangement 62 or spring tube 76, of the arm 57 and the anchor ring 74 on the table 84. The wire spool 48 is revolved in a clockwise direction, as viewed at the right hand end of the machine, by the yoke 35 at the same rate of speed at which turns of wire are laid on the pole for a reason to be more apparent later.

When the table 84 and the clamped field structure 93 are moved relative to the threading end 62 of the arm 57, the wire portion 222 is positioned adjacent an inwardly curved face 223 on the pole portion 99.

As soon as the cross-head member 176 has been rotated through a half turn it is held stationary, as previously described herein, and the cross-head member 198 is then rotated in a counter-clockwise direction through a half turn in a manner similar to the rotation of the cross-head member 176. This rotation of the cross-head member 198 swings the threading end of the arm 57 from the full line position to the dotted line position illustrated in Fig. 10. A portion 224 of the wire 50 is laid adjacent the back face 225 of the throat 100 on the field structure 93 as illustrated in full lines of Fig. 11. In this position, the wire portions 222 and 224 are in angular relation to each other by the engagement of the wire with a corner 226 on the throat portion of the field structure.

In the foregoing operation, if the threading arm 57 illustrated in Fig. 4 is used, the pulley 69 will rotate to follow the direction in which the wire is to be laid. If the threading arm illustrated in Fig. 5 is used, the flexible coil spring 76 will naturally follow in the direction in which the wire is pulled.

The cross-head member 198 is then held stationary and the cross-head member 176 rotated a half turn whereby the table 84 and the clamped field structure 93 are moved to the left. The wire portion 224 is thereby seated against the face 225 and a portion 227 of the wire is laid adjacent an inwardly curved surface 228 opposite to the side surface 223. When the clamp 86 has been moved to the left to its limit of movement, the flange 120a on the arm 105a is forced downwardly and carries with it the wire portion 224 to seat the latter at the bottom of the pole throat. The cross-head member 176 is then held stationary and the cross-head member 198 rotated a half turn to swing the threading end 65 of the arm 57 back across the face 220 of the clamp. A portion 229 of the wire 50 is thereby laid across the front face 230 of the throat 100 on the field structure 93. When the clamp 86 is next moved to the right the flange 120 on the arm 105 will force the wire portion 229 downwardly to seat at its bottom of the pole throat. Obviously, when the wire portions 224 and 229 are forced downwardly, the other wire portions 222 and 227 will also be moved downwardly relative to the surfaces of the pole throat which they engage.

By rotating the cross-head members 176 and 198 a complete loop around the throat 100 of the field structure 93 is effected by the wire portions 222, 224, 227 and 229. Continued rotation of the cross-head members will lay as many additional turns around the throat 100 as desired. Each additional turn will be stacked on the previously laid turn by operation of the flanges 120 and 120a of the stacking device 23A.

As each turn of wire is coiled around an object to be wound in a clockwise direction (as viewed looking down on the object), a counter-clockwise twist would normally be placed in the wire. In order that this twist be eliminated, the spool 48 is revolved around the axis of the shaft 34 in a clockwise direction as viewed from the right of the machine (Fig. 3). During the winding of one turn of wire around the throat 100, the wire, if the spool is not revolved about shaft 34, would be twisted once or 360° around its longitudinal axis in a counter-clockwise direction. Consequently, the wire spool 48 must be revolved once around the axis of the shaft 34 in a clockwise direction for each complete turn of wire wound in order to prevent any twisting. Generally speaking, the wire will twist in the opposite direction to that in which the coil is laid, and consequently, the wire must be rotated around its own axis in the same direction as the coil is being laid if untwisted wire is to be fed to the threading mechanism. It is to be understood, of course, that coils may be wound around an object in either direction, it being necessary only that the wire be untwisted in the same direction as the coils are laid as above described.

It will be noted that the sides of the throat 100 taper toward the annular frame 98 as illustrated at 231 in Fig. 6. The stacking device 23A is therefore necessary to tightly and evenly stack the turns of wire in superimposed relation. In this manner, each complete turn of wire coiled around the throat 100 will tightly overlie a previously formed turn of wire and a field coil thus wound will provide the greatest number of turns whose entire length is less than turns wound thereon by hand or by other methods known at the present time.

The modified form of construction of the machine 20' illustrated in Figs. 12 and 13, operates in the same manner as just described herein.

Summary

From the above description, it should be understood that the present invention now provides a high speed machine which uniformly and tightly winds an article, such as the pole of a field structure, with any desired number of turns of untwisted wire to form a coil. The various mechanisms of the machine are all positively driven and the threading mechanism and reciprocating table mechanism are both adjustable to provide for the winding of various sizes of objects with coils of wire. The wire feeding mechanism is positively driven for untwisting wire as it is drawn through the threading mechanism. Positive control of the various mechanisms by driving them from a single shaft makes possible an exact timing therebetween so that the machine can be run at very high speeds. Reciprocation of the table mechanism and swinging of the threading arm effect a rectangular application of a turn of wire to an object to be wound. However, should the object be shaped other than rectangular or square, a tight turn of wire will nevertheless be applied as the flexible wire will follow the contour of the object and not retain the rectangular position as illustrated.

While particular embodiments of this invention have been illustrated, it will, of course, be understood that the invention should not be limited thereto, since many modifications may be made, and, therefore, it is contemplated by the appended claims to cover all such modifications as fall within the true spirit and scope of the present invention.

I claim as my invention:

1. The method of winding strand material around an object which comprises moving the object to be wound substantially parallel to a length of the material, laying a length of the material in a transverse direction relative to the direction of movement of the object, moving the object back to its original position and against the transversely laid length of the material to thereby lay another length of the material parallel to said first length thereof, and laying an additional length of the material in a direction parallel to the direction along which said second mentioned length of the material is laid to complete a turn of the material around the object, said movements of the object and said laying of the lengths of the material being carried out in a single plane.

2. A machine for winding strand material around an object, comprising a movable member for carrying thereon said object, means mounting said member for reciprocation in a horizontal plane, a threading member carrying an intermediate portion of a length of said material and being mounted for swinging movements in a direction transversely of the movements of said reciprocating member, and means for alternately actuating said members for moving said object into and out of the path of movement of a portion of the material adjacent said threading member for winding a complete turn of the material around said object.

3. A machine for winding a coil of wire around an object, comprising an arm pivotally mounted at one end for movement in a horizontal plane and having an opening in the other end thereof, a reciprocating table for fixedly mounting thereon the object to be wound, means on said arm for frictionally carrying a wire passing through said opening in the end thereof, means for connecting the wire to said reciprocating table, and means for alternately reciprocating said table and swinging said arm whereby the object to be wound is moved into and out of the path of movement of said arm and a complete turn of wire is thereby wound around said object.

4. A machine for winding strand material around an object, comprising a table mounted for reciprocation and arranged to carry said object thereon, an arm having the ends thereof arranged for receiving therethrough an intermediate portion of said material and being mounted for swinging movements in a direction transversely of the movements of said reciprocating member, and means for alternately actuating said table and arm for reciprocating said object into and out of the path of movement of a portion of the material adjacent said arm for winding a complete turn of the material around said object.

5. A machine for winding a coil of wire around an object, comprising a needle arm having eyes at both ends thereof, a support column, a friction gripping mechanism, said gripping mechanism and one end of said arm having a wire passed therethrough with the other end of said arm being pivotally connected to said support column, a table for carrying the object to be wound mounted for reciprocation toward and away from said support column past said one end of said arm, a ring on said table for anchoring the terminal of the wire threaded through said arm, a driving gear mechanism having elements arranged to be rotated alternately, crank means connecting one of said elements to said table for reciprocating the latter whereby the object to be wound is moved past the one end of said arm, and additional crank means connecting the other of said elements to said arm for swinging said one end thereof beyond the sides of said object in directions transverse to the reciprocation of said table.

6. A machine for winding a coil of wire around an object, comprising a needle arm having eyes at both ends thereof, a support column for pivotally mounting one end of said arm to swing in a horizontal plane, a friction gripping mechanism, a yoke pivotally mounted adjacent said support column, a wire spool pivotally mounted in said yoke, a table for carrying the object to be wound mounted for reciprocation toward and away from said support column past the other end of said arm, a ring on said table for anchoring a wire drawn from said spool through said friction gripping mechanism and the eye on the other end of said arm, a driving gear mechanism having elements arranged to be rotated alternately, a main drive shaft connected to said elements and said yoke for rotating them at predetermined relative speeds, crank means connecting one of said elements to said table for reciprocating the latter whereby the object to be wound is moved past the threaded eye on said other end of the arm, and additional crank means connecting the other of said elements to said arm for swinging said other end thereof beyond the sides of said object in directions transverse to the reciprocation of said table.

7. A machine for winding a coil of wire around an object, comprising a needle arm having eyes at both ends thereof, a support column for pivotally mounting one end of said arm to swing in a horizontal plane, a friction gripping mechanism co-mounted with said arm on said support column, a positively driven yoke mounted adjacent said support column, a wire spool pivotally mounted in said yoke, a table for carrying the object to be wound mounted for reciprocation toward and away from said support column whereby the object is moved past the other end of said arm, an anchoring device on said table for holding the terminal of a wire drawn from said spool through said friction gripping mechanism and the eye on the other end of said arm, a gear mechanism having cross-head members arranged to be rotated alternately, a main drive shaft, means connecting said drive shaft to said cross-head members and to said yoke for rotating them at predetermined relative speeds, adjustable crank means connecting one of said cross-head members to said table for reciprocating the latter whereby the object to be wound is moved past the threaded eye on said other end of the arm, additional adjustable crank means connecting the other of said cross-heads to said arm for swinging said other end thereof beyond the sides of said object in directions transverse to the reciprocation of said table, and adjustable means actuated by said reciprocating table for stacking turns of wire as they are wound on said object.

8. A wire threading mechanism comprising an arm pivotally mounted at one end for swinging movements and having slot means therein for receiving an adjustable actuating crank for swinging said arm between predetermined limits, a wire tensioning device at said one end of the arm including spaced members adjustable toward and away from each other for receiving the wire therebetween, and a guide mechanism at the other end of said arm, said tensioning device being arranged for holding under tension a wire threaded therethrough and through said guide mechanism.

9. A wire threading mechanism arm comprising an elongated member having an eye at one end for receiving a pivotal mounting pin, an intermediate elongated slot for receiving an actuating crank, an angularly offset hollow portion at its other end, a guide pulley connected to said other end of the arm having its periphery in alignment with the axis of said hollow portion, a caster member having an apertured shank with an annular groove around the periphery thereof and a guide pulley, and a cap screw threaded through a wall of said hollow portion for seating in said annular groove when the caster shank is seated in said hollow portion for permitting rotative movement only of said caster member.

10. A wire threading mechanism comprising a movable arm, guide means on the ends of said arm arranged for threadedly carrying a movable wire therealong, said guide means including a guide pulley at one of said ends of the arm and a flexible tube on said arm for receiving the wire from said guide pulley and for guiding the movable wire therethrough as said arm is moved.

11. A wire threading mechanism comprising a wire supporting arm arranged for swinging movements between predetermined limits, a frictional wire gripping and guiding device on one end of said arm, a guide pulley on the other end of said arm, and a tightly wound coil spring tube at said other end of the arm for flexibly guiding therethrough a wire as it is drawn through said frictional gripping device and over said guide pulley.

12. A wire stacking device comprising a resilient arm adjustably mounted at one end thereof and having a wire engaging portion at its other end, a cam member carried by said arm between the ends thereof, and means movable toward and away from said arm engageable with said cam member for flexing said arm about its adjustable mounting.

13. An adjustable wire stacking device comprising a support member having a slot therein, a resilient arm having a wire engaging portion at one end thereof, means movable in said slot for adjustably mounting the other end of said arm on said support, cam means on said arm intermediate its ends, and actuating means movable toward and away from said arm engageable with said cam means for flexing said arm about its adjustable mounting on the support.

14. An adjustable wire stacking device comprising a support member having a slot therein, a resilient arm having a laterally extending wire engaging flange on one end thereof, means movable in said slot for adjustably mounting the other end of said arm on said support, a cam flange on an intermediate portion of said arm, a spring mounted cam member on said arm adjacent said cam flange, and a pivotally mounted bell crank movable toward and away from said arm, one of the bell crank legs engaging said cam flange for rocking the other of its legs against said cam member for flexing said arm about its adjustable mounting on the support.

15. An adjustable wire stacking device comprising a support member having an inverted T-shaped slot therein, a cap screw having its head and shank slidably seated in said slot, a resilient arm receiving the shank of said screw through one end thereof, a nut on said screw shank for fixedly mounting said arm on said support, a laterally extending wire engaging flange on the other end of said arm, a downwardly extending cam flange on an intermediate portion of said arm, a round headed cam bolt passing through the arm adjacent said cam flange and having nuts threaded on an end thereof against said arm, a compression spring between the head of said bolt and said arm, and a pivotally mounted bell crank movable toward and away from said arm, one of the legs on said bell crank engaging said cam flange for rocking the other of its legs against the head of said cam bolt for flexing said arm about its adjustable mounting on the support.

16. In a machine for winding a coil of wire around an object, a reciprocating member for carrying thereon said object, a threading member carrying an intermediate portion of a length of wire and being mounted for swinging movements in a direction transversely of the movements of said reciprocating member, and a driving mechanism for alternately actuating said members including rotatably mounted shaft members, "Geneva stop" gears mounted on said shaft members, interengaging means on said gears for alternately rotating said shaft members, cross-head members connected to said shafts, and crank members adjustably mounted on said cross-head members and connected to for actuating said reciprocating member and said threading member.

17. In a machine for winding a coil of wire around an object, a reciprocating member for carrying thereon said object, a threading member for frictionally receiving therethrough a wire and being mounted for swinging movements in a direction transverse to the movements of said reciprocating member, and a driving mechanism for alternately actuating said members including rotatably mounted shafts, interengaging "Geneva stop" gears mounted on said shafts, axially extending pins carried by one of said gears, the others of said gears having slots therein for receiving said pins, said pins and slots interengaging for alternately rotating the others of said gears as said one gear is continuously rotated, rotatably mounted cross-head members driven by said other gears, a block adjustably mounted on each of said cross-head members, and a crank member mounted on each of said blocks, one of said crank members being connected to said reciprocating member and the other of said crank members being connected to said threading member for alternately actuating them.

18. A method of winding untwisted strands of material around an object which comprises reciprocating the object to be wound in a horizontal plane, laying a length of the material transversely across the line of movement of said object between the reciprocating movements thereof whereby the object is moved into and out of the path of the material laying steps to complete a turn of material around the object, and simultaneously rotating the material once around its longitudinal axis in the same direction as the material is wound on the object once around its axis for preventing normal twisting of the material.

19. A machine for winding elongated material around an object comprising a pivotally mounted threading member for slidably carrying an intermediate portion of said material, a support member for carrying the object to be wound mounted for reciprocation toward and away from said threading member between adjustable limits, and means for alternately actuating said reciprocating support member and said pivoted threading member in intersecting paths of movement whereby a complete turn of the material is wound around the object.

20. The method of winding strand material around an object which comprises the step of alternately reciprocating the object to be wound, and the step of laying lengths of the material transversely back and forth across the path of movement of the object, the movement of said object and the transverse laying movement of the material all taking place in a single plane, whereby the object to be wound alternately presents opposite sides of itself to the path of the strand laying movement and a complete turn of material is wound around the object.

MAX KNOBEL.